US006873458B1

(12) United States Patent
Bakkom et al.

(10) Patent No.: US 6,873,458 B1
(45) Date of Patent: Mar. 29, 2005

(54) PROJECTION SCREEN ASSEMBLY

(75) Inventors: Jeffrey Scott Bakkom, Corvallis, OR (US); Dennis R. Esterberg, Philomath, OR (US); Glen Allen Oross, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/901,534

(22) Filed: Jul. 28, 2004

(51) Int. Cl.[7] .............................................. G03B 21/56
(52) U.S. Cl. ...................................... 359/443; 359/461
(58) Field of Search ................................ 359/443, 461; 160/29–30; D16/241

(56) References Cited

U.S. PATENT DOCUMENTS

| D323,338 S | * | 1/1992 | Court ......................... D16/241 |
| 5,798,861 A | * | 8/1998 | Doat ............................ 359/461 |
| 6,046,845 A | * | 4/2000 | Niwa et al. .................. 359/443 |
| 6,191,886 B1 | * | 2/2001 | Sinkoff ........................ 359/443 |
| 6,249,377 B1 | | 6/2001 | Takamoto et al. |
| 2002/0118151 A1 | * | 8/2002 | Chen ............................ 359/461 |

* cited by examiner

*Primary Examiner*—Christopher Mahoney

(57) ABSTRACT

A projection screen includes a member that functions as a support for holding the screen upright when the screen is in an open-position and as a fastener for holding the screen shut when the screen is in a closed-position.

25 Claims, 3 Drawing Sheets

PROJECTION SCREEN ASSEMBLY

BACKGROUND

Projection screens are widely used for displaying a variety of different visual media. Some screens are adapted for stationary use. For example, a movie theater typically includes a screen that remains in a deployed position in the same location at all times. Other screens are adapted for use at the same location, but can be opened and closed. For example, home theater screens typically are mounted in a set location, but can be opened or closed at that location. Some screens are adapted for portable use. For example, screens used in schools or businesses may include an easel that can be moved from place to place.

DETAILED DESCRIPTION

Figure 1:
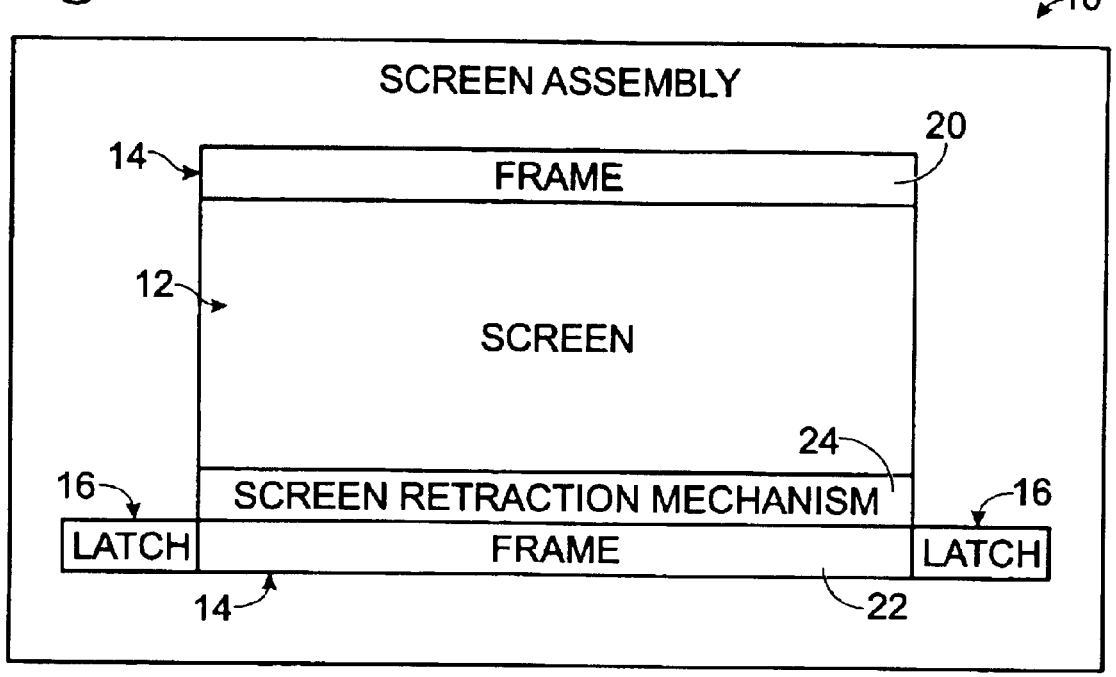
FIG. 1 schematically shows a projection screen according to the present disclosure.

FIG. 1 schematically shows a screen assembly 10 that includes a projection screen 12, a frame 14, and a latch 16. Screen 12 can be virtually anything upon which a desired image can be projected. The screen can be a reflection-type screen or a transmission-type screen. When deployed, screen 12 can provide a substantially planar surface for viewing a projected image. Screen 12 can be sized according to a desired application, with larger screens providing more viewable area and smaller screens offering enhanced portability.

Frame 14 can be configured for changing between open and closed positions, thus rendering screen assembly 10 suitable for portable applications. In particular, frame 14 can be used to support screen 12 in a deployed open-position, and the frame can also be used as a container for transporting the screen in a closed-position. The frame can take the form of a casing, with a top-case 20 and a bottom-case 22 between which the screen can be connected. When the screen is in an open-position, the top-case and bottom-case can be spaced apart from one another with the screen extending therebetween. When the screen is in a closed position, the top-case and bottom-case may fit together to effectively contain the screen.

A casing can include a screen retraction mechanism 24 that is configured to selectively collect and deploy the screen. As a nonlimiting example, the screen retraction mechanism can include a spring-biased roller around which the screen can roll when the screen is in a closed-position and from which the screen can be extended when the screen is in an open-position.

Latch 16 can be designed to provide dual functions depending on whether the screen is in an open or closed position. For example, latch 16 can be used to fasten the screen in a closed-position, thereby preventing the screen from accidentally opening. Latch 16 can also be configured to provide a base support for holding the screen in a substantially upright open-position. In this manner, the latch provides a fastening function when the screen is closed and a supporting function when the screen is open. Latch 16 can be used alone or in combination with other fastening or supporting mechanisms.

FIGS. 2–6 show an exemplary screen assembly 40, which is provided as a nonlimiting example of the screen assembly schematically illustrated in FIG. 1. Screen assembly 40, as well as the various features and aspects thereof, is provided as only one illustrative example and is not intended to define or limit the entire scope of this disclosure.

Figure 2:
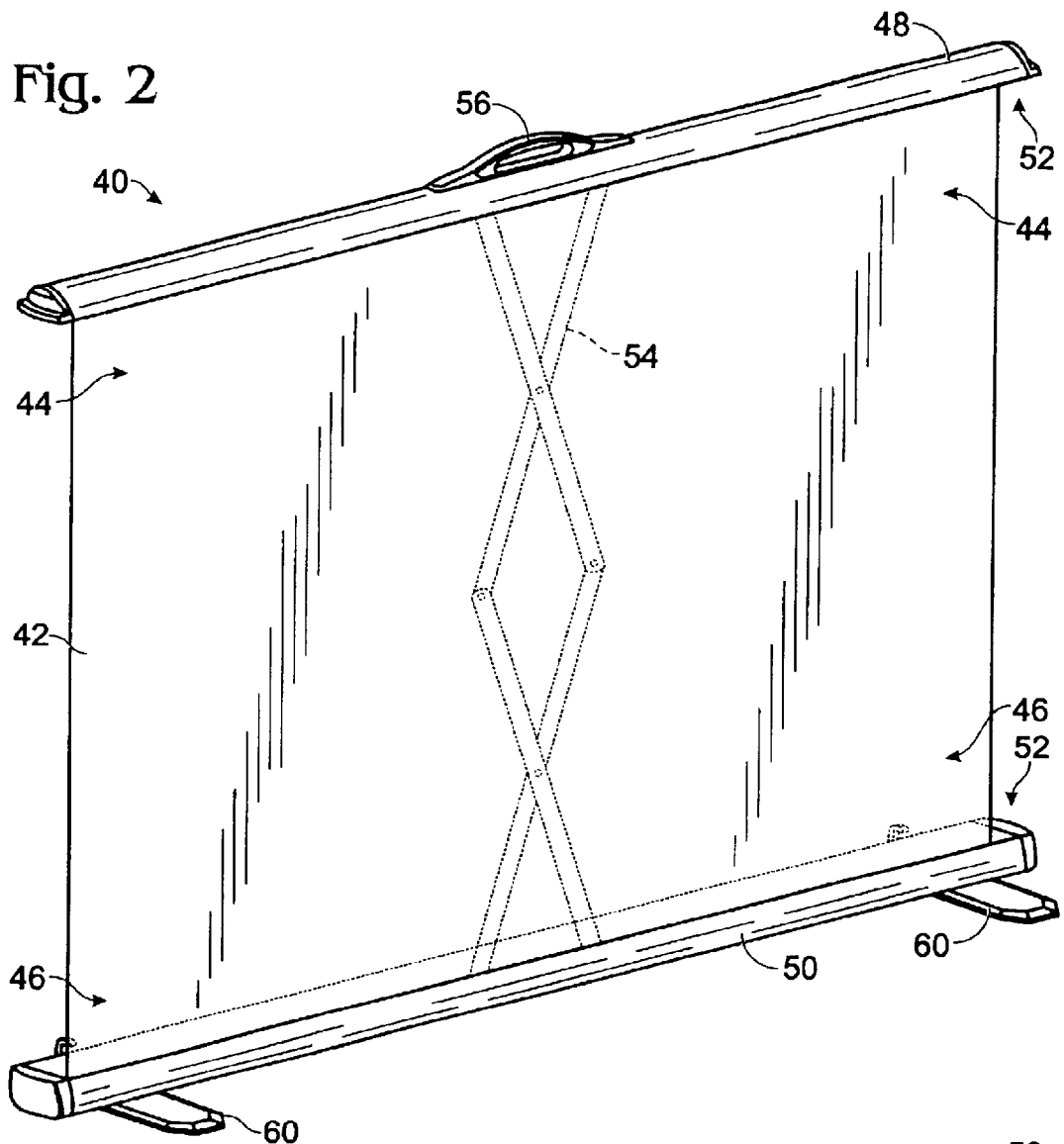
FIG. 2 shows an exemplary projection screen in an open-position.

FIG. 2 shows screen assembly 40 in an open-position in which a screen 42 is deployed for viewing. As a nonlimiting example, the screen may include a natural or synthetic fabric with a matte white surface. The screen includes a top side 44 and a bottom side 46. The top side of the screen can be operatively connected to a top-case 48 and the bottom side of the screen can be operatively connected to a bottom-case 50. The top-case and bottom-case are constituent elements of a casing (or frame) 52. As shown in dashed lines, a support structure 54 can extend between and hold apart the top-case and the bottom-case. Support structure 54 can be configured to fold away or otherwise retract when the screen is closed.

When the top-case is held apart from the bottom-case, such as by support structure 54, the screen is effectively spread between the respective frame members, thus forming a substantially planar surface for displaying a projected image. The surface can be relatively flat, so as to avoid undesired distortion of the projected image. In some embodiments, the screen may be configured to enhance reflectance, transmittance, visual clarity, viewing angle, color saturation, and so on.

Figure 3:
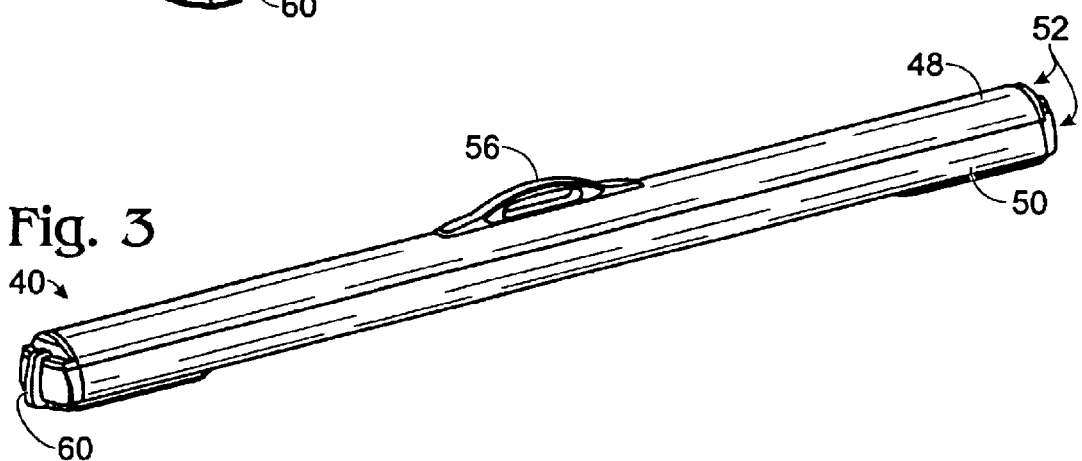
FIG. 3 shows the projection screen of FIG. 1 in a closed-position.

FIG. 3 shows screen assembly 40 in a closed-position. Top-case 48 and bottom-case 50 of the screen assembly can be configured so as to form a continuous surface that meets without any abrupt discontinuities when in a closed-position. In addition to the aesthetic appeal of such a design, a non-abrupt transition from the top-case to the bottom-case can help reduce the chance of snagging or otherwise stressing the screen assembly when moving the screen assembly.

As can be seen by comparing FIG. 2 to FIG. 3, screen assembly 40 is substantially smaller in a closed-position than in an open-position. When in a closed-position, screen 42 can be completely contained between the top-case and the bottom-case, although this is not required. In some embodiments, a screen may be only partially contained. Because damage such as stains, tears, stretches, and the like, can reduce performance of the screen, it can be beneficial to limit exposure of the screen to anything that could cause such damage. To this end, the casing can be configured to provide at least some protection to a closed screen. For example, the casing can be made of durable materials adapted to hold up to the rigors associated with transport and repeated set-ups and tear-downs, such as metal or plastic or other synthetic materials. In some embodiments, the casing can be configured to effectively isolate the screen from potential harm by forming a barrier that is difficult to penetrate. A relatively tight fit between the top-case and the bottom-case can promote such a barrier. Due to reduced size and increased protection, a screen assembly in a closed-position may be able to be easily and/or safely moved from one viewing location to another.

To facilitate easy transportation of the screen assembly, a handle can be provided. In the illustrated embodiment, a handle 56 is integrated with top-case 48. Handle 56 can be used to pick up and move the screen assembly when it is in a closed-position. Handle 56 can also be used to change the screen assembly from a closed-position to an open-position by providing a gripping location for separating the top-case from the bottom-case.

FIG. 2 shows exemplary latch 60 in a support-position in which the latch holds, or supports, the screen in an upright open-position. In other words, when the screen is deployed for viewing, latch 60 can serve as a foot upon which the screen assembly can stand. As shown, the foot is orientated substantially perpendicular to the plane of screen 42 so as to help prevent the screen from tipping forward or backward. The length of latch 60 can be selected to provide a desired level of support, with increased lengths generally providing increased support. For example, a latch that extends to the front and/or back of the screen by at least one inch, two inches, three inches, four inches, five inches, six inches, eight inches, twelve inches, or more can be used to support variously sized screens.

In general, due to the minimal tipping forces that a screen will encounter during normal use, adequately-sized latches will provide all the support that is needed. However, some embodiments may include auxiliary support mechanisms such as magnets, suction cups, hook and loop fasteners, and the like, attached to the bottom surface of the latch. In some embodiments, additional support can be achieved by adding anchoring weights on top of a latch in a support-position.

Figure 4:
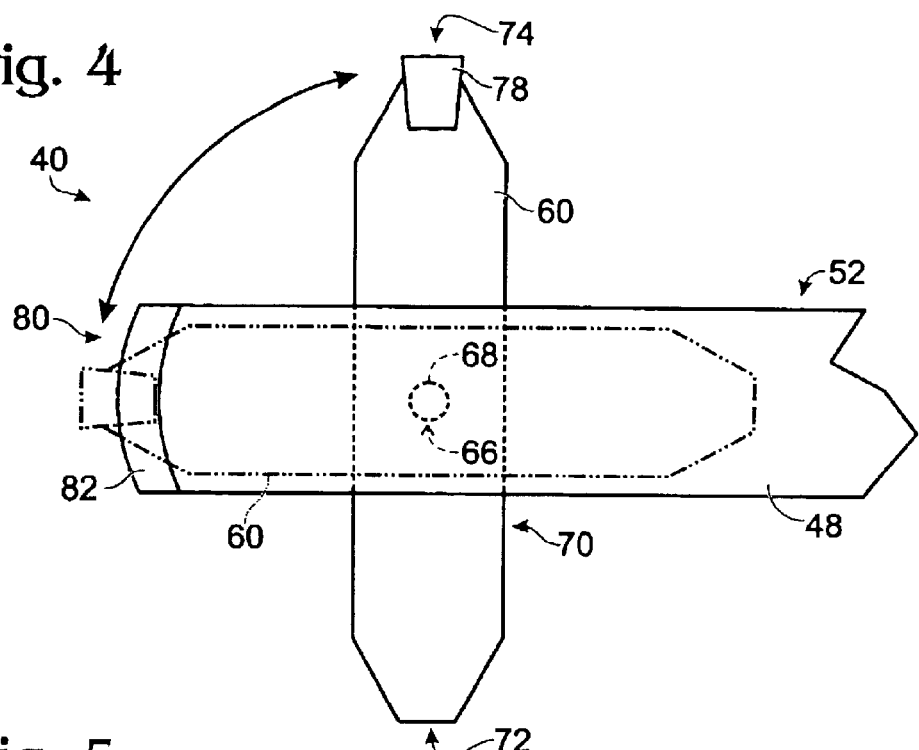
FIG. 4 is a top view of an exemplary latch of the projection screen of FIG. 1.
Figure 5:
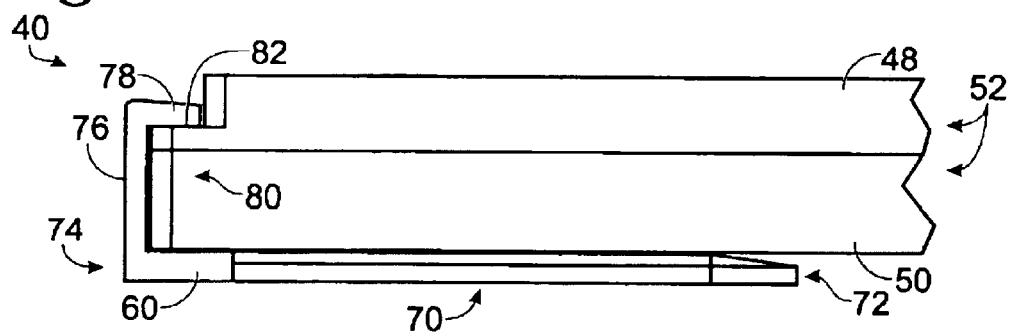
FIG. 5 is a front view of the latch of FIG. 4 in a latched-position.
Figure 6:
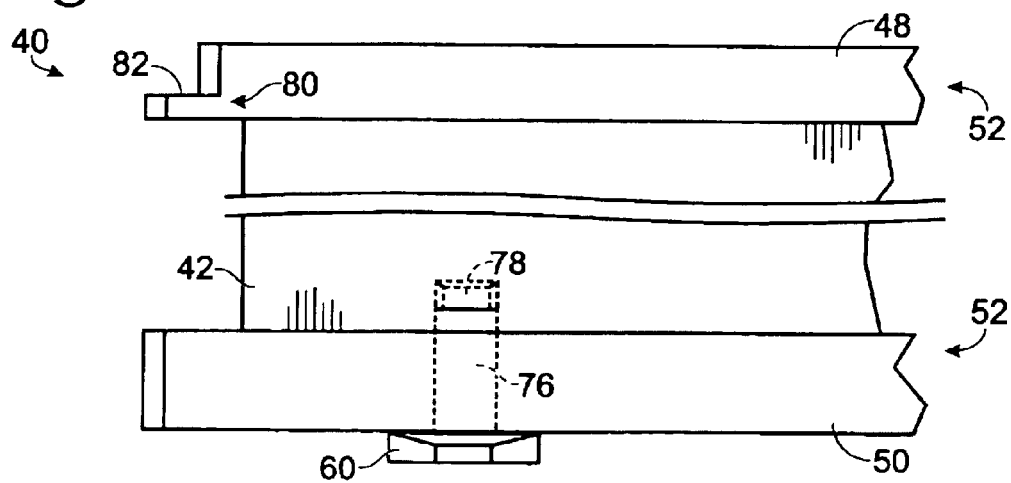
FIG. 6 is a front view of the latch of FIG. 4 in a support-position.

FIG. 3 shows exemplary latch 60 in a fastened-position holding the case in a closed-position. In other words, when engaged, latch 60 can fix the relative position of top-case 48 and bottom-case 50. In particular, latch 60 can secure the top-case and the bottom-case in a mated engagement with the screen protected therebetween. FIGS. 4–6 show exemplary latch 60 in greater detail.

FIG. 4 shows a top view of exemplary latch 60 changing from a support-position (shown in solid lines) to a fastened-position (shown in dashed lines). Latch 60 can be positioned substantially perpendicular to casing 52 when the latch is in a support-position. Likewise, latch 60 can be positioned substantially parallel to casing 52 when the latch is in a fastened-position.

The screen assembly can include a joint 66 that allows the latch to change positions. In the illustrated embodiment, the joint includes a pin 68 about which the latch can rotate. As shown, the pin can be placed approximately in the middle of the latch. In other embodiments, a pin can be positioned closer to the front of the latch, thus causing the latch to extend farther behind the screen than in front of the screen when the latch is in a support-position. Likewise, the pin can be positioned closer to the back of the latch, thus causing the latch to extend farther in front of the screen than behind the screen when the latch is in a support-position. Joints other than pin-joints can also be used in some embodiments.

In the illustrated embodiment, latch 60 includes a foot portion 70 having a front 72 and a rear 74. Foot portion 70 can be configured to limit the extent to which the latch extends from the casing when the latch is in a fastened-position. In particular, the foot portion can be shaped with a low profile that closely hugs the contours of casing 52. The foot portion can also be configured to provide a stable base for supporting the screen when the latch is in a support-position.

Exemplary latch 60 can be shaped to provide a sturdy and easy to operate fastening mechanism. In the illustrated embodiment, latch 60 can be described as having a J-shape. As can be seen in FIG. 5, a bridge 76 extends upward from the rear of the foot portion, and a catch 78 extends laterally from the bridge. When the latch is in a fastened-position, bridge 76 is positioned adjacent an end of the casing. The bridge can arc around the end of the casing into this position when the latch is moved from the support-position to the fastened-position. When in the fastened-position, the catch is positioned above a latching shelf 82 of top-case 48. Catch 78 can be configured to engage the latching shelf 82, effectively holding the top-case against the bottom-case and preventing the top-case from moving apart from the bottom-case.

When the latch changes from a support-position to a fastened-position, bridge 76 and catch 78 can move in an arc with a radius corresponding to their distance from pin 68. As best shown in FIG. 4, an end 80 of casing 52, including latching shelf 82, can be curved so that the bridge and the catch track the profile of the casing as the latch is moved from a support-position to a fastened position, and vice versa. A curved end can facilitate a tight fit between the latch and the casing, even when a simple pin joint is used.

FIG. 6 shows a front view of screen assembly 40 when latch 60 is in a support-position. As can be seen, when the latch is in a support-position, catch 78 is not in position to engage latching shelf 82, thus allowing top-case 48 to be moved apart from bottom-case 50 so that the screen assembly can be changed to an open-position. Because the same structure that is used to hold the screen assembly in a closed-position is used to support the screen in an upright open-position, the necessary support will naturally be in place before the screen is raised into an open-position. Furthermore, the act of unlatching the casing and moving a support into position is combined into the same action, thus easing the process of setting up the screen assembly. Likewise, a single action can latch the screen in a closed-position and put the support away for storage or transport.

Although the present disclosure has been provided with reference to the foregoing operational principles and embodiments, it will be apparent to those skilled in the art that various changes in form and detail may be made without departing from the spirit and scope defined in the appended claims. The present disclosure is intended to embrace all such alternatives, modifications and variances. Where the disclosure or claims recite "a," "a first," or "another" element, or the equivalent thereof, they should be interpreted to include one or more such elements, neither requiring nor excluding two or more such elements.

What is claimed is:

1. A projection screen assembly, comprising:
   a screen;
   a top-case and a bottom-case selectively moveable between a closed-position in which the screen is stored within at least one of the top-case and the bottom-case and an open-position in which the screen is deployed between the top-case and the bottom-case; and
   a member on the bottom-case selectively moveable between a fastened-position in which the member holds the top-case and the bottom-case together in the closed-position and a support-position in which the member supports the screen assembly in the open-position.

2. The screen assembly of claim 1, wherein the member is substantially parallel to the screen in the fastened-position and the member is substantially perpendicular to the screen in the support-position.

3. The screen assembly of claim 1, wherein the member is configured to pivot between the support-position and the fastened-position.

4. The screen assembly of claim 1, wherein the member is configured to laterally pivot in a plane that is substantially perpendicular to the screen in the open-position.

5. The screen assembly of claim 1, wherein the member includes a joint configured to pivot the member between the support-position and the fastened-position.

6. The screen assembly of claim 1, wherein the member includes a bridge, and wherein the bridge arcs around an end of the top-case and the bottom-case as the member pivots from the support-position to the fastened-position.

7. The screen assembly of claim 1, wherein an end of the top-case and the bottom-case is curved to track an arc of the member.

8. The screen assembly of claim 1, wherein the member includes a foot portion and a catch connected by a bridge, wherein the foot portion is pivotably connected to the bottom-case and the catch is configured to engage the top-case.

9. The screen assembly of claim 1, wherein the top-case and the bottom-case are configured to completely surround the screen in the closed-position.

10. The screen assembly of claim 1, wherein the member is proximate an end of the bottom-case.

11. The screen assembly of claim 1, wherein the member is one of two members positioned at opposite ends of the bottom-case.

12. The screen assembly of claim 1, wherein the member includes a catch and the top-case includes a latching shelf, and wherein the catch engages the latching shelf in the fastened-position.

13. The screen assembly of claim 1, wherein the member includes a bridge, and wherein the bridge is positioned adjacent an end of the top-case and the bottom-case in the fastened-position.

14. The screen assembly of claim 1, wherein the top-case includes a handle.

15. A projection screen assembly, comprising:
a screen; and
a member selectively moveable between a fastened-position in which the member fastens the screen in a closed-position and a support-position in which the member supports the screen assembly on a horizontal surface in an open-position.

16. The screen assembly of claim 15, wherein the member is one of two members positioned at opposite ends of the screen.

17. A projection screen assembly, comprising:
a screen including a top portion and a bottom portion;
a top-case operatively connected to the top portion of the screen, wherein the top-case includes a left end and a right end, and wherein the left end of the top-case includes a left-end latching-shelf and the right end of the top-case includes a right-end latching-shelf;
a bottom-case operatively connected to the bottom portion of the screen, wherein the bottom-case includes a left end and a right end;
a left-end latch mounted to the bottom-case proximate the left end of the bottom-case and configured to selectively engage the left-end latching-shelf, thereby holding the top-case and the bottom-case together;
a right-end latch mounted to the bottom-case proximate the right end of the bottom-case and configured to selectively engage the right-end latching-shelf, thereby holding the top-case and the bottom-case together;
wherein the left-end latch and the right-end latch are configured to respectively disengage the left-end latching-shelf and the right-end latching-shelf and to pivot into position to support the screen assembly in a generally upright position.

18. The screen assembly of claim 17, wherein the left-end latch and the right-end latch respectively pivot approximately 90 degrees to support the screen in a generally upright position.

19. The screen assembly of claim 17, wherein the left-end latch and the right-end latch respectively laterally pivot in a plane that is substantially perpendicular to the screen.

20. The screen assembly of claim 17, wherein the bottom-case includes a screen retraction mechanism.

21. A projection screen assembly, comprising:
screen means for displaying a projected image;
case means selectively moveable between a closed-position in which the screen means is stored within the case means and an open-position in which the screen means is deployed by the case means; and
latch means on the case means selectively moveable between a fastened-position in which the latch means holds the case means in the closed-position and a support-position in which the latch means supports the case means in the open-position.

22. A projection screen assembly, comprising:
screen means including a top portion and a bottom portion;
top-case means operatively connected to the top portion of the screen means, wherein the top-case means includes a left end and a right end, and wherein the left end of the top-case means includes a left-end latch-receiving means and the right end of the top-case means includes a right-end latch-receiving means;
bottom-case means operatively connected to the bottom portion of the screen means, wherein the bottom-case means includes a left end and a right end;
left-end latch means mounted to the bottom-case means proximate the left end of the bottom-case means and configured to selectively engage the left-end latch-receiving means, thereby holding the top-case means and the bottom-case means together;
right-end latch means mounted to the bottom-case means proximate the right end of the bottom-case means and configured to selectively engage the right-end latch-receiving means, thereby holding the top-case means and the bottom-case means together;
wherein the left-end latch means and the right-end latch means are configured to respectively disengage the left-end latch-receiving means and the right-end latch-receiving means and to pivot into position to support the screen assembly in a generally upright position.

23. A projection screen assembly, comprising:
a casing adapted to hold a screen; and
a member selectively moveable between a fastened-position in which the member secures the casing closed and a support-position in which the member supports the casing on a horizontal surface.

24. The projection screen assembly of claim 23, wherein the casing includes a top-case and a bottom-case selectively configurable to substantially contain the screen within the casing.

25. The projection screen assembly of claim 24, wherein the member is configured to hold the top-case and the bottom-case together when in the fastened-position.

* * * * *